April 22, 1969     O. R. NEMETH     3,439,981

MOTION-PICTURE PROJECTOR

Filed April 12, 1966     Sheet _1_ of 2

INVENTOR
OTTO R. NEMETH
BY *Elliott & Pastoriza*
ATTORNEYS

April 22, 1969     O. R. NEMETH     3,439,981

MOTION-PICTURE PROJECTOR

Filed April 12, 1966     Sheet 2 of 2

INVENTOR.
OTTO R. NEMETH
BY Elliott & Pastoriza
ATTORNEYS

United States Patent Office 3,439,981
Patented Apr. 22, 1969

3,439,981
MOTION-PICTURE PROJECTOR
Otto R. Nemeth, Los Angeles, Calif., assignor, by mesne assignments, to GAF Corporation, New York, N.Y., a corporation of Delaware
Filed Apr. 12, 1966, Ser. No. 541,984
Int. Cl. G03b 1/22
U.S. Cl. 352—191
6 Claims

ABSTRACT OF THE DISCLOSURE

Reversible apparatus having a friction roller for driving the take-up spool in a forward direction and a second friction roller for driving the supply spool in a reverse direction for rewinding the film. Both drive rollers are mounted on a movable arm. When the single control knob is rotated in one direction, cam actuated linkage is thereby shifted for simultaneously establishing a drive through the take-up reel and closing the plates which define the film gate. When this knob is rotated in the other direction, the cam actuated linkage operates for simultaneously opening the gate and establishing a drive to the supply reel in a rewind mode of operation. The same control knob also operates switching to control the drive motor and the projection lamp. A manually operated eccentric engages the drive claw to provide a means for framing adjustment.

---

This invention relates generally to motion-picture projectors and more particularly to an improved motion-picture projector primarily designed for home use.

In the design of a motion picture projector for use by home owners, it is desirable to provide as simple a mechanism as possible from the operating standpoint. Towards this end, it is now common practice to provide projectors which will automatically thread the film themselves and in which the number of controls have been considerably reduced, all to the desirable end that the home owner or average housewife may easily operate the projector.

Simplifying the actual controls and operation for the projector, however, has often necessitated a far more complex operating mechanism with a resultant increase in expense and a decrease in reliability of the projector over prolonged periods of time. Thus, while the operation of the projector may be relatively simple, the mechanisms for carrying out this operation which are normally hidden from the operator have become relatively complicated requiring additional components.

It is with the foregoing in mind that the motion-picture projector of the present invention was designed, and it is, accordingly, a primary object of this invention to provide a vastly improved motion-picture projector for home use which is extremely simple to operate and yet in which the structure itself is of a unique and optimum design to the end that long life is assured.

More particularly, it is an object to provide an improved motion-picture projector in which a great economy is effected in the number of parts required to manufacture the projector, various necessary features on the projector heretofore requiring separate controls being so designed as to be operable by the multiple use of single components.

A particular object of this invention is to provide an improved motion-picture projector in which there is provided a unique design for the pull down claw mechanism such that proper framing of the film in the aperture plate can be effected through the medium of the pull down claw mechanism itself.

Another particular object of this invention is to provide a unique drive mechanism wherein a single control knob enables all of the various functions such as projecting and rewinding as well as automatic threading to be carried out in a fully automatic manner.

More general objects of this invention are to provide a unique motion-picture projector which is far more economical to manufacture than projectors capable of similar performance heretofore available.

Briefly, these and many other objects and advantages of this invention are attained by providing a basic supporting frame for the projector including a take-up reel spindle means, a pay-out reel spindle means, a movable film gate and guide structure, and a pull down claw mechanism all mounted on the frame structure. A driving roller also mounted on the frame structure is coupled to the pull down claw mechanism, and through a single integral closed loop belt, coupled to drive the take-up and pay-out reel spindle means through suitable first and second movable friction rollers, respectively.

Cooperating with the foregoing is an actuating plate which may be shifted between neutral and first and second positions by a single control knob in such a manner as to cause the friction rollers to engage one or the other of the take-up reel spindle means or pay-out reel spindle means for operating the projector in a normal manner or for rewinding the film. This action is effected through a camming arrangement to cause the friction rollers to engage or disengage the reel spindle means and also to simultaneously operate the movable film gate and guide structure for engaging or releasing the film. There thus results a very simple mechanism which incorporates a minimum number of parts and yet is still very simple to operate by a user.

A particular feature of the invention relates to the novel provision of framing means wherein the pull down claw mechanism itself is also employed to effect proper framing of the film in the aperture. Essentially, this framing is effected by shifting the rocking pivot point for the pull down claw mechanism in a vertical direction to thereby uniformly shift the starting and terminal points of the downward movement of the pull down claws in a vertical direction.

A better understanding of the invention, as well as additional features and advantages, will be had by referring to the accompanying drawings, in which.

Figure 1:
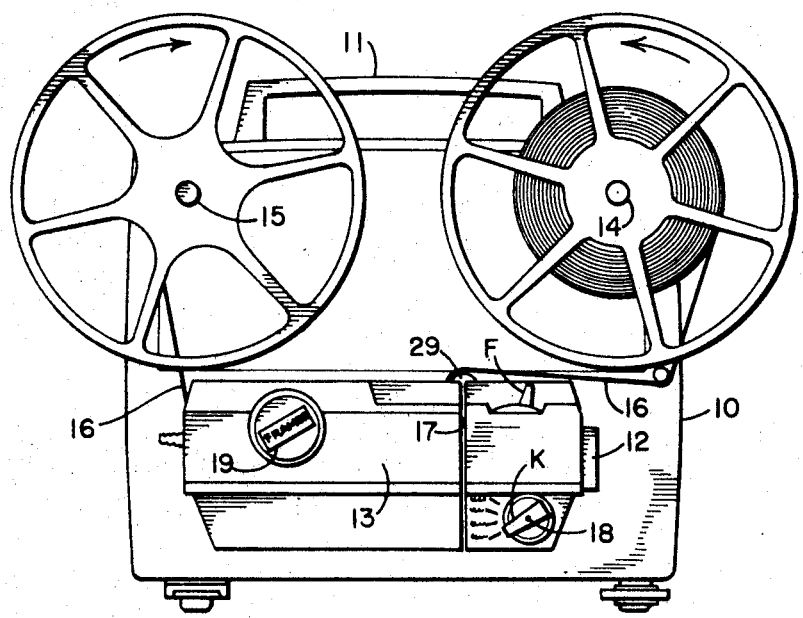
FIGURE 1 is a side elevational view of the motion-picture projector of this invention.

Referring first to FIGURE 1, the motion picture projector illustrated is for a Super 8 mm. movie film, but it will be understood that the principles are applicable to 16 mm. or even 35 mm. projectors as well as conventional 8 mm. projectors.

The projector itself includes a basic frame structure 10 which may be provided with a suitable carrying handle 11. The projection lens structure is indicated at 12 and is in the forward part of a housing 13 serving to cover and thus protect certain mechanism for driving the film.

The pay-out reel spindle is indicated at 14 and the take-up reel spindle is indicated at 15, suitable reels being illustrated in position on these spindles. The film itself is indicated at 16 and is arranged to pass through a film gate mechanism 17 and the housing 13 from the pay-out reel to the take-up reel. Control of the projector to run the film through in a normal projecting operation or to rewind the film is effected by a knob K mounted on a shaft 18 passing through to the rear of the frame 10.

The only other controls necessary are a framer knob 19 and a focus lever F.

Figure 2:
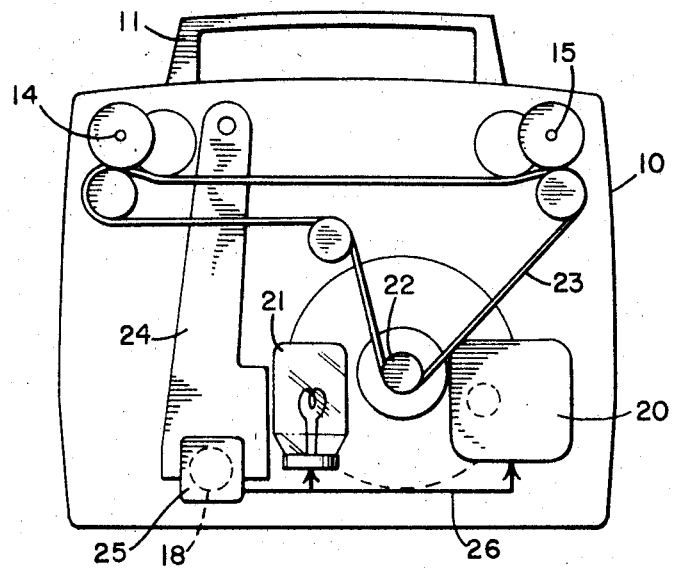
FIGURE 2 is a view similar to FIGURE 1 showing the opposite side of the projector with a covering plate removed to expose certain of the interior mechanism.

Referring now to the rear view of FIGURE 2, there is shown a motor 20, projection lamp 21, and drive roller 22. A single integral closed loop belt 23 passes over the drive roller 22 and various friction rollers for rotating the spindle means 14 and 15 in accordance with the position of an actuating plate or arm 24. The position of this actuating plate 24 is controlled by the shaft 18 for the knob K, and this shaft also controls a switch within a box 25 for actuating the motor 20 and projection lamp 21 as indicated by the lines 26. Further details with respect to the various components shown in FIGURE 2 will be described subsequently.

Figure 3:
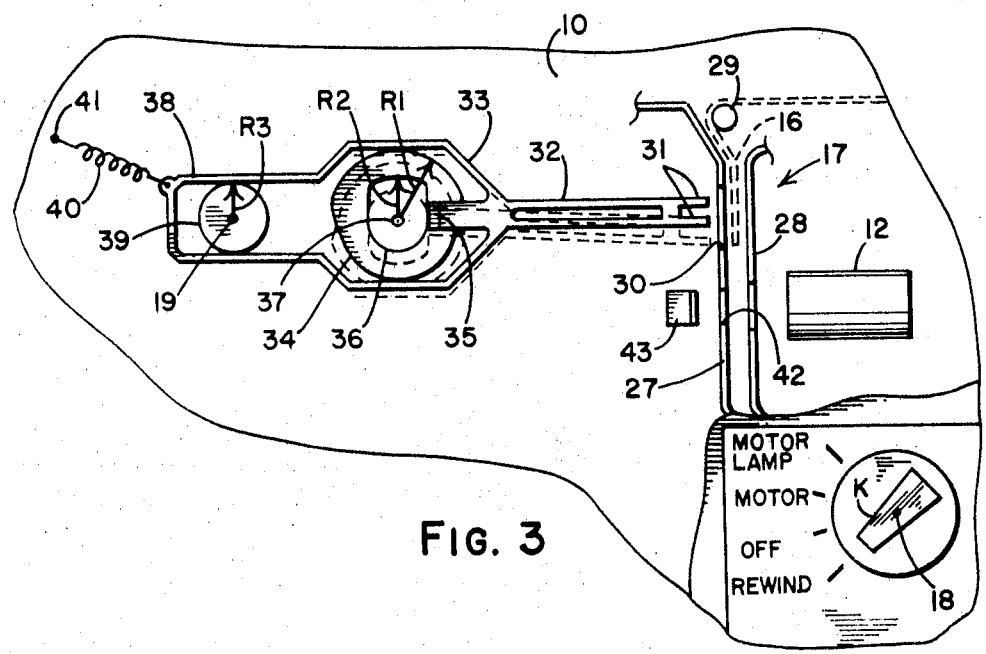
FIGURE 3 is a fragmentary enlarged elevational view of the pull down claw mechanism and novel framing means.

Referring now to FIGURE 3, there is illustrated an important feature of the invention relating to the pull down claw mechanism for advancing the film one frame at a time through the film gate structure 17. FIGURE 3 illustrates mechanism that would be visible upon removal of the housing 13 of FIGURE 1.

As shown in FIGURE 3, there is provided a stationary aperture plate 27 cooperating with a movable film gate 28. The film gate is shown in spaced or open condition. Film 16 passes between the aperture plate and film gate about a guide roller 29. The arrangement is such that the movable film gate 28 and roller 29 may be moved simultaneously to the left to guide and support the film against the aperture plate 27.

The aperture plate includes an open slot portion 30 for receiving pull down claws 31 at one end of an elongated arm structure 32 constituting part of the pull down claw mechanism. This arm structure 32 includes a first cam follower means 33 cooperating with a compound cam including an up and down cam wheel 34. The cam wheel 34 is provided with a radius R1 over its upper half greater than the remaining radial portions of the wheel such that the first cam follower means 33 will be caused to oscillate up and down upon rotation of the cam wheel 34.

The first cam follower mechanism 33 also includes an in and out cam follower 35 engaging a second cam wheel 36 constituting part of the compound cam structure. It will be noted that the cam wheel 36 includes a radius R2 which is greater than the radius of the remaining portion of the wheel which will effectively cause in and out motion of the arm structure 32 when the compound cam structures 34 and 36 are rotated. The compound cam wheels 34 and 36 are mounted for rotation about a common shaft 37 for the driver roller 22 described in FIGURE 2 so that rotation of the drive roller 22 will rotate the compound cam structure.

The other end of the pull down claw arm structure to the left, as viewed in FIGURE 3, includes a second cam follower means 38. The second cam follower means 38 cooperates with a framing cam wheel 39 rotated by shaft 19 connecting to the framer control designated by the same numeral 19 in FIGURE 1. A biasing spring 40 connects between the second cam follower means and a stationary point 41 to bias the cam follower portion 35 against the surface of the cam wheel 36.

With the foregoing arrangement, if the framer cam wheel 39 is set in a given stationary position, it will define a rocking pivot point for the elongated arm structure such that upon rotation of the compound cam wheels 34 and 36, the end of the elongated arm 32 and thus the pull down claws 31 will execute given motions. More specifically, a single cycle of operation as determined by a single rotation of the compound cam wheels 34 and 36 will include, starting from the position illustrated in FIGURE 3 and assuming that rotation is clockwise, an inward movement, a downward movement, an outward movement, and an upward movement. The framer cam wheel 39 has a radius R3 greater than the remaining radii so that rotation of this cam wheel shifts the rocking pivot point in a vertically downward direction.

With reference now to the stationary film aperture plate 27, there is illustrated a film aperture opening 42. This aperture opening is in line with the projection lens 12 and a 45° mirror 43 which projects the light received through an opening in frame 10 from the projection lamp 21 illustrated in FIGURE 2, through the film aperture, film and projection lens 12.

In the event that the film frame does not register with the aperture 42, the framer control shaft 19 is rotated slightly to shift the cam wheel 39 illustrated in FIGURE 3, and thereby essentially move, in a vertical direction, the pivoting or rocking point of the elongated arm structure as described. Thus, for example, if the framer is rotated in a counterclockwise direction to move the longer radius R3 towards the left, the effective pivoting point will be lowered slightly resulting in the starting and terminal points of the downward movement of the claws 31 being uniformly raised a slight amount. Movement of the framing shaft 19 further in a downward direction to a 180° position from that shown will result in maximum raising of the starting and terminal points of the downward movement of the claws 31. It will thus be seen that this arrangement provides a very easy means for framing the film frames with respect to the aperture opening 42.

Referring now to the lower righthand portion of FIGURE 3, various positions for the control knob K on the shaft 18 are illustrated. In an off or neutral position, the movable film gate 28 is open as shown and the guide roller 29 is spaced from the stationary aperture plate 27. When the knob K is moved to a first rotated position, such as in a clockwise direction to the motor position, the guide roller 29 is automatically moved towards the stationary aperture plate to press the film thereagainst and the movable film gate 28 is moved to the left so that the film is held in a position to be engaged by the pull down claws 31 after their inward movement. When the knob K is moved to an opposite rotated second position such as from the neutral position to the rewind position illustrated in FIGURE 3, the movable gate 28 is automatically opened and the guide roller 29 releases pressure on the film so that the film is no longer held against the stationary aperture plate 27. By this latter arrangement, it will become evident as the description proceeds that the film may be rewound while it is still threaded through the projector.

Figure 4:
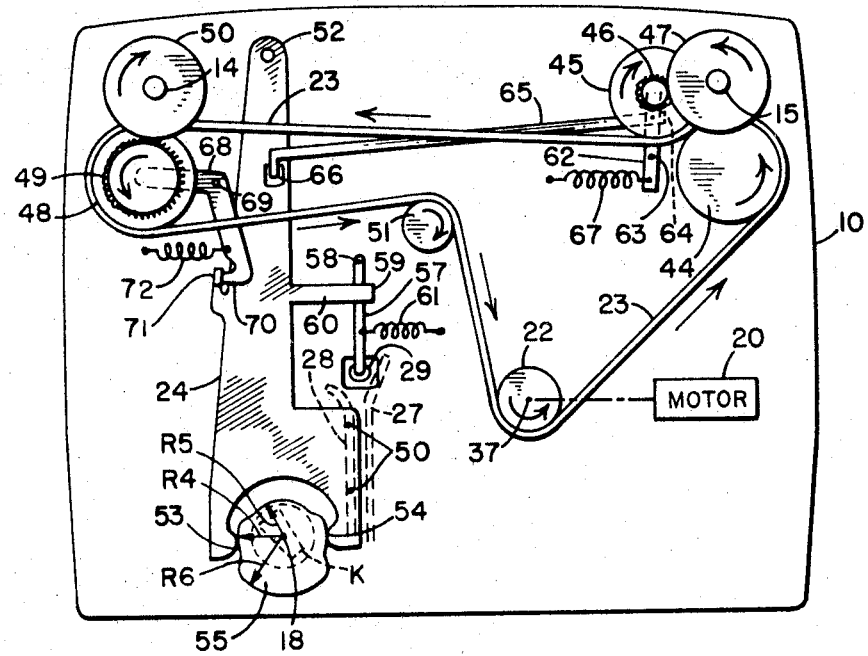
FIGURE 4 is a fragmentary enlarged elevational view of certain components illustrated in FIGURE 2 with certain others of the components removed to avoid obscuring the drawing.

The manner in which the foregoing operations take place as well as the manner in which further driving components are actuated by the single knob structure K will be evident by now referring to the details of FIGURE 4.

In FIGURE 4, it will be noted that the driving belt 23 from the drive roller 22 passes over a roller 44 of such diameter as to cause the drive belt to engage a first movable friction roller 45 having a smaller diameter friction surface 46 engaging a roller 47 secured to the take-up reel spindle 15. With this arrangement, when the drive roller 22 is driven in a counterclockwise direction by the motor 20, the roller 44 will rotate in a counterclockwise direction and the roller 45 will rotate in a clockwise direction. The friction engaging peripheral surface 46 will then cause the take-up reel spindle roller 47, when it is engaged by the surface 46, to rotate in a counterclockwise direction. This direction will appear as a clockwise direction as viewed in FIGURE 1 and as indicated by the arrow.

Referring to the upper left portion of FIGURE 4, it will be seen that the integral belt structure subsequently passes about a second movable friction roller 48 including a reduced diameter peripheral friction surface 49 engaging a drive roller 50 for the pay-out reel spindle 14. Again, it will be seen that when the second movable friction roller portion 49 moves in a counterclockwise direction, the pay-out reel spindle roller 50 and pay-out reel spindle 14 will, when engaged by the surface 49, move in a clockwise direction. This motion will appear as a counterclockwise direction as indicated by the dotted line arrow in FIGURE 1.

From the second movable friction roller 48, the belt 23 passes about a guide roller 51 back to the drive roller 22 as shown.

The actuating plate 24 described briefly in FIGURE 2 is shown in FIGURE 4 as pivotally mounted at its upper end at 52. The lower ends of the actuating plate 24 terminate in a bifurcated structure defining cam follower surfaces 53 and 54 in opposing relationship for engaging portions of a cam wheel 55 secured to the shaft 18 for the knob K. The cam wheel 55 is thus rotatable with the knob K.

The actuating plate 24 is secured at 56 through suitable slots in the frame directly to the movable film gate 28 illustrated in dotted lines in FIGURE 4. Also, the guide roller 29, which is caused to move simultaneously with the movable film gate 28, is connected to an arm 57 pivoted at 58 and having an intermediate portion engaged by the end 59 of a lateral extension 60 from the plate 24. A biasing spring 61 normally tends to hold the guide roller 29 in engagement with the stationary aperture plate 27, but in the position shown, this guide roller is held out of engagement by the arm end 59 on the actuating plate 24.

Referring to the upper righthand corner of FIGURE 4, the first movable friction roller structure 45 and 46 is mounted on an arm 62 pivoted at 63 and adapted to be engaged at an intermediate point by the end 64 of an extending arm 65. The other end of the arm 65 is coupled to the actuating plate 24 as at 66. A small spring 67 connects an over-extending portion of the arm 62 to a stationary point so as to bias the friction surface 46 into engagement with the take-up reel spindle roller 47. However, the friction surface 46 is held out of engagement with the roller 47 by the arm 65 for certain positions of the actuating plate 24.

Finally, the second movable friction roller structure 48 and 49 is supported on a bell crank shaped arm 68 pivoted at 69 and having its lower end 70 arranged to be engaged by a small projecting portion 71 on the actuating plate 24. A biasing spring 72 is connected to the arm as shown to exert a force tending to rotate the bell crank arm 68 in a clockwise direction and thus urge the friction roller portion 49 into engagement with the pay-out spindle roller 50.

With the foregoing description of the various components in mind, the operation of the motion picture projector can now be described.

In the position of the cam wheel 55 illustrated in FIGURE 4, the knob 18 is in its off or neutral position. In this position, the actuating plate 24 is cammed by the cam follower portions 53 and 54 engaging the cam wheel 55 to a position such that: First, the guide roller 29 and movable film gate 28 are in the positions illustrated in FIGURE 3 and; second, the first and second friction rollers 46 and 49 are out of engagement with the spindle rollers 47 and 50. Preferably, however, there is a light frictional engagement between the friction rollers and the spindles such that the spindles will rotate with a slight drag force.

With the knob K in the off position as described, film may be threaded from the pay-out reel on spindle 14 as illustrated in FIGURE 1 by passing the film about the guide roller 29 and inserting its end into the space between the movable gate 28 and aperture plate 27 to a sufficient extent as to pass the normal position of the pull down claws 31, as shown in FIGURE 3.

If now the knob 18 is moved to a first rotated position, designated "MOTOR" in FIGURE 3, cam wheel 53, as viewed in FIGURE 4, will be rotated in a counterclockwise direction such that the camming surface of radius R4 is removed from engagement with the cam follower portion 53 of the actuating plate 24 and a lesser radius surface R5 engages this camming surface. Simultaneously, the larger radius camming surface R6 engages the right-hand fork cam follower portion 54 of the actuating plate to urge it to the right. As a consequence, the actuating plate 24 swings to the right as illustrated in FIGURE 4 or in a counterclockwise direction with respect to the pivot point 52.

The foregoing action releases the arm 57 so that the spring 61 can move the guide roller 29 into engagement with the aperture plate 27 to hold the film thereagainst, and simultaneously, the movable gate structure 28 closes against the aperture plate 27. Also, as a consequence of this movement, the bell crank type arm 68 is caused to rotate in a counterclockwise direction about its pivot point 69 to free the pay-out spindle roller 50 from tight engagement with the friction portion 49 of the second movable friction roller 48. It is preferred, however, that there remain a slight bit of friction on the pay-out reel spindle roller 50 so that a small amount of tension is provided on the film and complete free wheeling of the pay-out reel is prevented. This provision of a light frictional engagement is important in preventing undue unreeling of the film from the pay-out reel and the provision of a slight drag on the pay-out spindle by the friction roller prevents such accidents.

In addition to the foregoing, movement of the actuating plate 24 to the right as viewed in FIGURE 4 will release the arm 62 such that the spring 67 will tend to rotate the arm 62 about the pivot point 63 so that the friction portion 46 of the first movable friction roller 45 engages the take-up reel spindle roller 47. This engagement is a relatively tight engagement, but some slippage is permitted.

When the knob 18 is moved to the "MOTOR" position as described, the motor switch is actuated to energize the motor 20, thereby driving the drive roller 22 in a counterclockwise direction as viewed in FIGURE 4. As mentioned heretofore, the drive roller 22 is connected directly to the compound cam structure 34 and 36 of the pull down claw mechanism described in FIGURE 3 so that with reference to FIGURE 3, this compound cam structure will rotate in a clockwise direction.

As a consequence of rotation of the compound cam structure, the pull down claws will be caused to move inwardly through the opening 30 in the stationary aperture plate 27, the claws 31 engaging the perforations on the initial portion of film threaded between the movable film guide 28 and aperture plate 27.

The pull down claw mechanism will thus urge the film down through the guide structure and through suitable mechanism such as guide rollers and around spring biased buffer rollers and the like (not shown) to the take-up reel 15 as illustrated in FIGURE 1. This reel is rotating in a clockwise direction as a consequence of the engagement of the first movable friction roller portion 46 with the take-up reel spindle 47 as described in conjunction with FIGURE 4 so that the film will be caught on the reel and automatically be wound up.

After threading, the knob K may be moved to a third position designated motor-lamp to light the projection lamp. The cam surfaces on wheel 55 are the same in this position as in the motor position so that the actuating plate is not affected.

If the picture frame is not in exact registration with the aperture 42, the framer knob shaft 19 may be rotated as described in conjunction with FIGURE 3 to effect proper framing. This action may take place while the pull down claw mechanism is in full operation.

As the film is projected, the diameter of film wound on the take-up reel structure of FIGURE 1 increases so that it is not desirable for the reel spindle 15 to be rotating at the same rate as when the film was initially wound on the reel. It is towards this end that the friction drive feature is important in the present invention in that some frictional drag is permitted between the first movable frictional roller 46 and the take-up reel spindle roller 47.

At any point in the film or after the film has completely run through the projector except for the tail end which preferably is still connected to the pay-out reel, the knob 18 may be moved to the off position and thence to a second rotated position juxtaposed "rewind" as illustrated in FIGURE 3.

With reference once again to FIGURE 4, movement of the knob 18 in this direction turns off the lamp and results in the cam wheel 55 moving in a clockwise direction from the position illustrated in FIGURE 4 until the large cam surface of radius R6 engages the cam follower 53 and the smaller cam surface of radius R5 engages the cam follower portion 54. This action thus rocks the actuating plate 24 to the left or in a clockwise direction with respect to the pivot point 52.

When the actuating plate 24 moves to the left, it will be evident that the arm end 59 of the arm 60 will rock the arm 57 to the left to retract the guide roller 29 from the film and simultaneously the movable film guide 28 will be moved away from the aperture plate 27, thereby releasing the film from engagement by the pull down claw structure. Also, this movement of the actuating plate to the left will relieve pressure on the lower end of the bell crank arm 68 so that the spring 72 will rotate this bell crank arm 68 in a clockwise direction and thus increase the frictional engagement of the second movable friction roller portion 49 with the pay-out reel spindle roller 50.

Finally, the rocking of the actuating plate 24 to the left will exert a force on the arm 65 pulling the arm 62 and thus the first movable friction roller portion 46 away from the take-up reel spindle roller 47 so that the take-up reel spindle roller 47 and spindle 15 are free to rotate. Again, however, there may still be retained a slight frictional engagement of the frictional surface 46 with the roller 47 in order to provide a slight tension in the film during rewinding.

The motor M is arranged to be re-energized when the knob 18 is turned to the rewind position so that the drive roller 22 will again be moved in the same direction and as a consequence of this movement, rewinding of the film will take place.

From the foregoing description, it will be evident that the present invention has provided a vastly improved motion picture mechanism wherein a minimum number of parts are employed and wherein certain parts serve dual functions. Not only is framing effected through the medium of the pull down claw mechanism, but in addition, the entire structure may be operated in a normal projection manner or in a rewind manner by the same driving mechanism and by means of only a single rotatable knob. Further, the feature of the first and second movable friction rollers for controlling the operation of the take-up and pay-out reel spindles is an important feature in that suitable adjustments can be made in the manufacture so that various degrees of friction between the rollers are provided to provide the proper torque and film tension.

In regard to the foregoing, it is to be understood in this specification and in the accompanying claims that statements to the effect that the first or second movable friction rollers are placed into or out of engagement with the spindle means are to be interpreted to the effect that when in engagement, a relatively tight positive drive is provided although some slippage is still permitted and when out of engagement, there may still be some slight frictional engagement merely to maintain a desired tension in the film.

While only one specific embodiment of the invention has been set forth and described, many changes and modifications falling within the scope and spirit of this invention will occur to those skilled in the art. The invention accordingly is not to be thought of as limited to the one example set forth merely for illustrative purposes.

What is claimed is:

1. A motion-picture projector including: a supporting frame, a take-up reel spindle means, a pay-out reel spindle means, a movable film gate and guide structure, and a pull-down claw mechanism all mounted on said frame structure; a driving roller mounted on said frame structure and coupled to said pull-down claw mechanism; a first movable friction roller for driving said take-up reel spindle means; a second movable friction roller for driving said pay-out reel spindle means; closed loop belt means interconnecting said driving roller and first and second movable friction rollers; actuating means mounted to said frame structure and including cam means connected with arm means, the latter being coupled to said film gate and guide structure and said first and second movable friction rollers; and a single rotatable control knob connected to said cam means for rocking said arm means in a first direction when said control knob is rotated from a neutral position to a first rotated position to simultaneously close said movable film gate and cause said guide structure to engage a film, move said first movable friction roller into engagement with said take-up reel spindle means, and move said second movable friction roller out of engagement with said pay-out reel spindle means, rotation of said control knob from said neutral position to a second rotated position rocking said arm means in a second direction to simultaneously open said movable film gate and cause said guide structure to disengage said film, move said first movable friction roller out of engagement with said take-up reel spindle means, and move said second movable friction roller into engagement with said pay-out reel spindle means.

2. A motion-picture projector according to claim 1, including a driving motor for rotating said driving roller upon energization; and switch means actuated by said knob from an open to a closed condition to energize said motor when said knob is rotated from said neutral position to said first rotated position whereby said take-up reel spindle means is caused to rotate by said first movable friction roller and said pay-out reel spindle means is free to permit film to pay out therefrom.

3. A motion-picture projector according to claim 2, in which said switch means is actuated from an open to a closed condition to energize said motor when said knob is rotated from said neutral position to said second rotated position whereby said take-up reel spindle means is disengaged by said first movable friction roller and said pay-out reel spindle means is engaged by said second movable friction roller to effect a rewinding of film from said take-up reel spindle means to said pay-out reel spindle means.

4. A motion-picture projector according to claim 1, in which said first and second movable friction rollers are in light frictional engagement with said take-up reel spindle means and said pay-out reel spindle means when said knob is in said neutral position.

5. A motion-picture projector according to claim 1, in which said pull down claw mechanism comprises an elongated arm terminating at one end in pull down claws and at its other end in support means enabling rocking type pivotal movement of said elongated arm; a compound cam wheel coupled for rotation by said driving roller and engaging said arm at an intermediate portion to cam said arm in a cycle of inward, downward, outward, and upward movements; and means for shifting the rocking and pivoting point of the other end of said arm whereby the starting and terminal points of the downward motion of said claws may be uniformly shifted in a vertical direction to enable the framing of film engaged by said claws.

6. The motion-picture projector according to claim 1 wherein said closed loop belt means is defined by a single continuous belt.

References Cited

UNITED STATES PATENTS 2,144,277 1/1939 Wall _____ 226—62
3,159,841 12/1964 Castedello _____ 352—124 X

FOREIGN PATENTS 501,188 2/1939 Great Britain.

NORTON ANSHER, *Primary Examiner.*
M. H. HAYES, *Assistant Examiner.*

U.S. Cl. X.R.

352—173, 194